United States Patent [19]
Wille

[11] Patent Number: 5,947,422
[45] Date of Patent: *Sep. 7, 1999

[54] TAIL FOR AN AIRCRAFT

[75] Inventor: Robert Henry Wille, St. Charles, Mo.

[73] Assignee: McDonnell Douglas

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,732

[22] Filed: Apr. 29, 1997

[51] Int. Cl.[6] .............................. B64C 3/14; B64C 3/50; B64C 9/00

[52] U.S. Cl. ...................... 244/219; 244/214; 244/215; 244/87

[58] Field of Search ................................. 244/214, 215, 244/219, 454, 87, 89, 130

[56] References Cited

U.S. PATENT DOCUMENTS

| | | | |
|---|---|---|---|
| 3,109,613 | 11/1963 | Bryant et al. | 244/219 |
| 3,109,614 | 11/1963 | Steidl | 244/87 |
| 3,575,363 | 4/1971 | Jenny et al. | 244/87 X |
| 3,666,211 | 5/1972 | Cathers et al. | 244/87 X |
| 3,698,668 | 10/1972 | Cole | 244/219 |
| 4,096,817 | 6/1978 | Bordat | 244/219 X |
| 4,247,066 | 1/1981 | Frost et al. | 244/219 |
| 4,429,844 | 2/1984 | Brown et al. | 244/219 |
| 4,598,888 | 7/1986 | Beteille | 244/45 A X |
| 5,181,678 | 1/1993 | Widnall et al. | 244/219 |
| 5,222,699 | 6/1993 | Albach et al. | 244/213 |
| 5,367,970 | 11/1994 | Beauchamp et al. | 244/219 X |
| 5,794,893 | 8/1998 | Diller et al. | 244/219 X |

*Primary Examiner*—Charles T. Jordan
*Assistant Examiner*—Theresa M. Wesson
*Attorney, Agent, or Firm*—Dale B. Halling

[57] ABSTRACT

A tail (14) for an aircraft (10) has a center member (20) pivotally attached to the aircraft (10). A leading edge flap (22) extends along a length of the center member (20). An elastomeric skin (30) is connected between an exterior surface (26) of the center member (20) and an adjacent exterior surface (28) of the leading edge flap (22).

11 Claims, 3 Drawing Sheets

TAIL FOR AN AIRCRAFT

FIELD OF THE INVENTION

The present invention relates generally to the field of aircraft and more particularly to a tail for an aircraft.

BACKGROUND OF THE INVENTION

Modern aircraft incorporate horizontal stabilizers or canards (tails) to provide trim for level flight and control of roll, yaw, and pitch. These tails normally are designed to pivot on spindles to provide incidence deflection angles to enable effective control at supersonic speeds, where conventional "flapped" horizontal tails and elevators are ineffective due to shock waves. However, at subsonic maneuvering speeds these spindled tails generate less lifting coefficient than flapped tails, thus larger tails are required. At subsonic speeds large tails create more skin friction drag and supersonic speeds large tails create additional wave drag. The designer must balance these two constraints, producing an aircraft that is neither optimized for supersonic speeds or slower speeds.

Thus there exists a need for a smaller tail that can produce large lifting forces/moments at low speeds (high angles of attack) and still pivots to create effective control at supersonic speeds in the presence of shock waves.

SUMMARY OF THE INVENTION

A tail for an aircraft that overcomes these and other problems has a center member pivotally attached to the aircraft. A leading edge flap extends along a length of the center member. An elastomeric skin is connected between an exterior surface of the center member and an adjacent exterior surface of the leading edge flap.

DETAILED DESCRIPTION OF THE DRAWINGS

Figure 1:
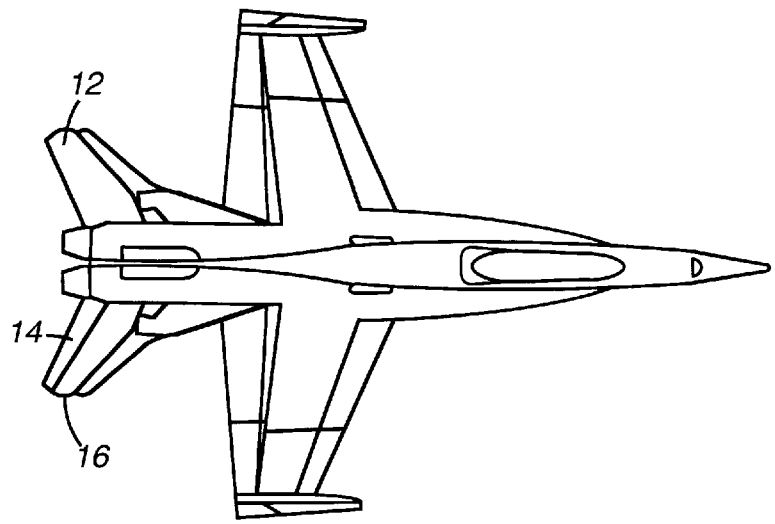
FIG. 1 is a top view of a modern aircraft.
Figure 2A:
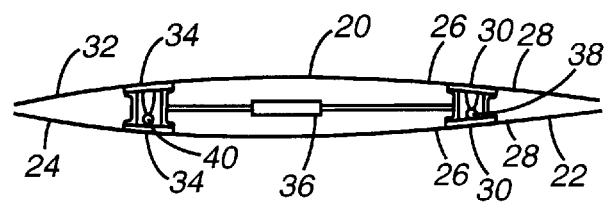
FIGS. 2a and 2b are cross sections of a tail according to the invention.
Figure 2B:
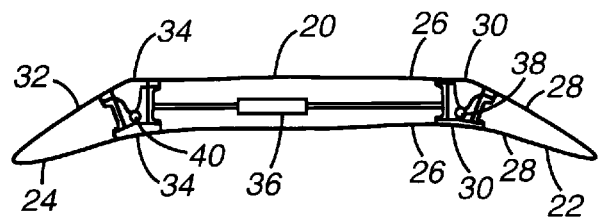

FIG. 1 shows a top view of a modern aircraft 10. The aircraft 10 has a pair of tails 12, 14. The tail 14 shows a pair of hingelines 16 that are indicative of the tail (canard or horizontal stabilizers) of the invention. FIGS. 2a and 2b show a cross section of the tail 14 for an aircraft according to the invention. The tail 14 consist of a center, load carrying member 20 that is pivotally connected to the aircraft. The center member (center section) 20 is pivotally connected to a leading edge flap (lead edge member) 22. The leading edge flap 22 extends along the length of the center member 20. A trailing edge flap 24 is pivotally connected to the center member 20. The leading edge flap 22 can be pivoted from its first position (FIG. 2a) to a second position (FIG. 2b) outside the moldline of the center member 20. By pivoting the leading edge flap 22 and/or the trailing edge flap 24 a larger airfoil camber is created, which allows the tail to generated a larger pitch moment. As a result, large lifting forces and pitching moments can be created at slow speeds (high angles of attack) while drag can be minimized at supersonic speeds. This is accomplished without a large tail surface. Alternatively, fixed camber designs like the McDonnell Douglas F-4 Phantom horizontal tail work at slower speeds, however compromise supersonic performance.

The exterior surface 26 of the center member 20 is connected to an adjacent exterior surface 28 of the leading edge flap 28 by an elastomeric skin 30. The exterior surface 26 of the center member is also connected to an exterior surface (trailing exterior surface) 32 of the trailing edge flap 24 by another elastomeric skin (second elastomeric skin) 34. The function of the elastomeric skin will be described in more detail with respect to FIGS. 4 and 5.

A worm drive 36 drives the leading edge flap 22 and the trailing edge flap 24. The leading edge flap 22 pivots along a pivot 38. The trailing edge flap 24 pivots along a pivot 40. While other drive mechanisms can be used, the worm drive 36 drives both the leading edge flap 22 and the trailing edge flap 24 simultaneously. The actuator is located in the center (thickest part of the tail, near the pivot line) which reduces spindle actuator loads, by reducing hingeline inertia. In addition, the worm drive (mechanical actuator) 36 can have a separate drive ratio for the leading edge flap and the trailing edge flap. For instance, the pitch rate (first drive ratio) of the leading edge flap 22 can be two times the pitch rate (second drive ratio) of the trailing edge. This simplifies the control systems for the tail 14 and minimizes the need for separate actuators.

Figure 3:
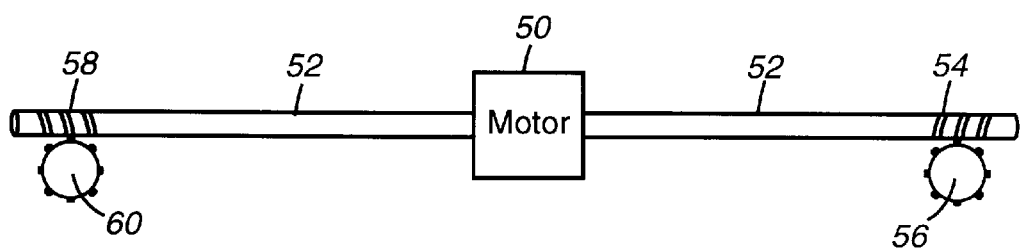
FIG. 3. is a schematic view of a worm drive used in the tail of FIGS. 2a and 2b.

FIG. 3 shows a schematic drawing of the worm drive (actuation mechanism) 36. A motor 50 spins a drive rod 52. A leading edge spiral drive groove 54 mates with leading edge cog 56. The drive ratio of the leading edge flap can be adjusted by changing the cog size. A trailing edge spiral drive groove 58 mates with a trailing edge cog 60 to drive the trailing edge flap 24. In addition, the worm drive fits easily within the small space of the tail 14.

Figure 4:
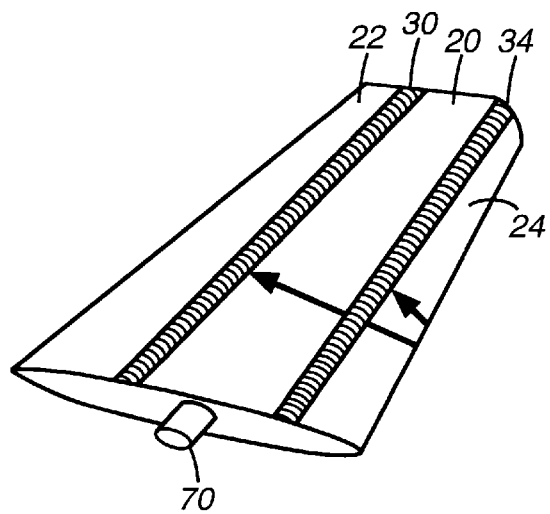
FIG. 4 is a perspective view of the tail of FIGS. 2a and 2.

FIG. 4 is a perspective view of the tail 14. The center section 20 is connected to the leading section 22 by an elastomer skin 30. Without the elastomer skin 30 a gap would exist between the center section 20 and the leading section 22 and the trailing section 24. This gap would allow dirt and contaminants to enter the tail 14. In addition, the gap would create turbulence and allow flow through the tail that would reduce the aerodynamic effectiveness of the tail 14. The center section 20 is pivotally connected to the aircraft by a spindle 70. The tail 14 can be pivoted about its centerline with respect to the aircraft using the spindle 70. Pivoting the spindle allows the tail 14 to be correctly oriented with respect to the airflow to produce the required pitch moment required at supersonic speeds.

Figure 5:
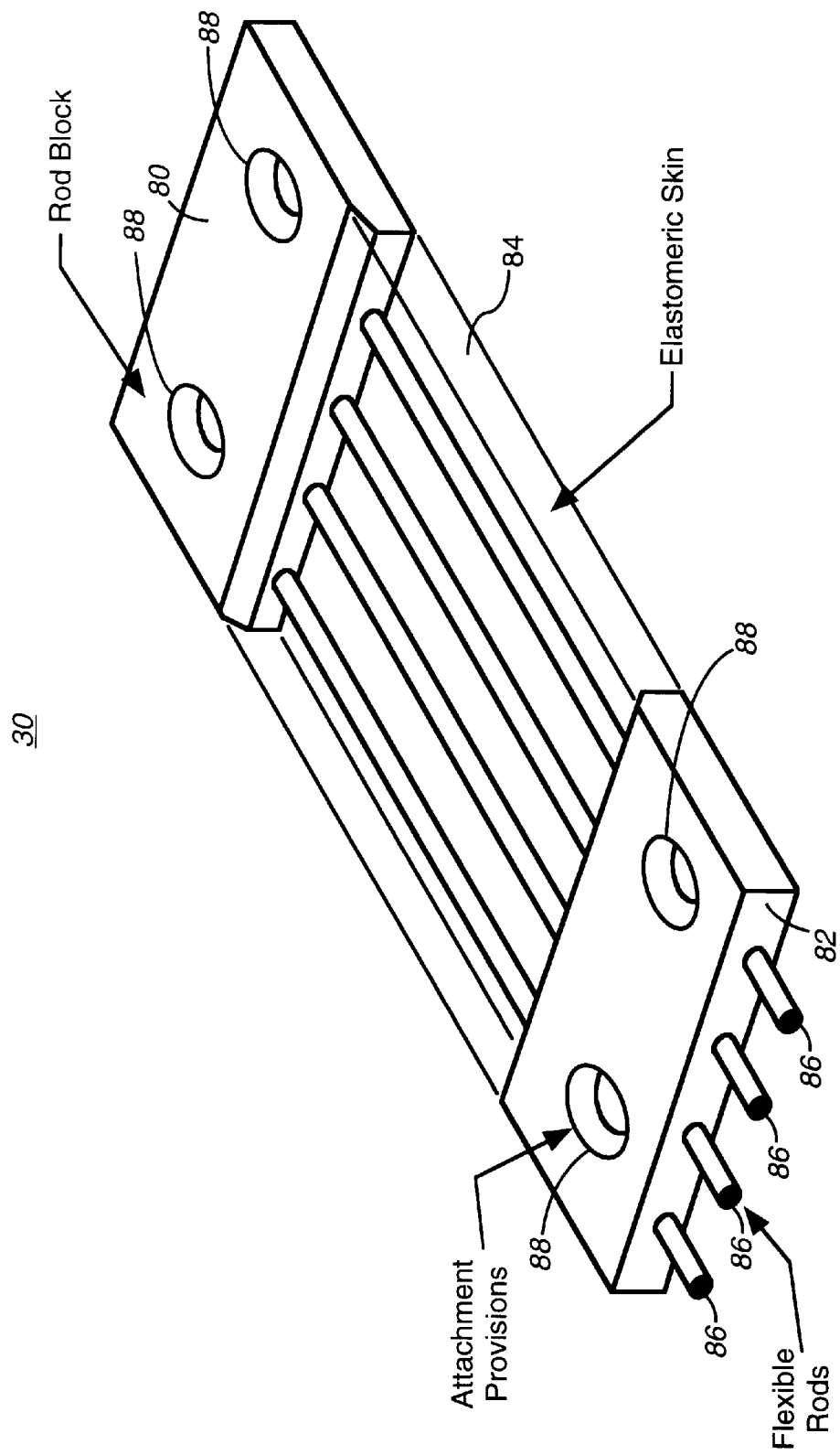
FIG. 5 is a perspective view of a reinforced elastomer panel.

FIG. 5 shows an embodiment of an elastomeric skin (reinforced elastomeric panel) 30 used on the tail 14. A pair of rod blocks 80, 82 are attached to an elastomer skin 84. A plurality of flexible reinforcing rods 86 are attached to one rod block 80 and slide freely through the elastomer skin 84 and the second rod block 82. The plurality of flexible reinforcing rods 86 form a smooth curvilinear surface when the elastomer panel is elongated, deflected and twisted. A plurality of attachment provision 88 allow the elastomer panel 30 to be attached to the center section 20 and the leading edge flap 22 (trailing edge flap 24).

Thus there has been described a tail (canard, horizontal stabilizer) that provides adequate pitch moments at slow speeds and high angles of attack, without creating excessive drag at supersonic speeds. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A tail for an aircraft, comprising:

a center member pivotally attached to the aircraft;

a leading edge flap extending along a length of the center member and having a single pivot;

a trailing edge flap extending along a length of the center member and having a single pivot;

a worm drive that actuates the leading edge flap and the trailing edge flap simultaneously; and a reinforced elastomeric panel connected between an exterior surface of the center member and an adjacent exterior surface of the leading edge flap, the reinforced elastomeric panel having a flexible reinforcing rod contained in an elastomer skin and being capable of elongating.

2. The tail of claim 1, further including a second elastomeric skin connected between the exterior surface of the center member and a trailing exterior surface of the trailing edge flap.

3. The tail of claim 2, wherein the worm drive has a first drive ratio for the leading edge and a second drive ratio for the trailing edge.

4. The tail of claim 3, wherein the first drive ratio is not equal to the second drive ratio.

5. A tail for an aircraft comprising:

a center section capable of pivoting about a centerline;

a leading edge section pivotally attached to the center section, the leading edge having a single pivot;

a trailing edge section pivotally attach to the center section, the trailing edge having a single pivot; and a single actuation mechanism coupled to the leading edge section and the trailing edge section.

6. The tail of claim 5, wherein the actuation mechanism is a worm drive that has a first drive ratio for the leading edge section and a second drive ratio for the trailing edge.

7. The tail of claim 6, wherein the first drive ratio is not equal to the second drive ratio.

8. The tail of claim 5, further including a reinforced elastomeric panel covering a gap between the center section and the leading edge section.

9. The tail of claim 5, further including a reinforced elastomeric panel covering a gap between the center section and the trailing edge section.

10. A horizontal stabilizer for an aircraft comprising:

a center member pivotally connected to the aircraft;

a trailing edge flap pivotally attached to the center member having a single pivot;

a leading edge flap pivotally attached to the center member having a single pivot;

a reinforced elastomer panel connected between an exterior surface of the center member and an adjacent exterior surface of the trailing edge flap and capable of being elongated; and a single actuation mechanism connected to the trailing edge flap and leading edge flap, moving the trailing edge flap and the leading edge flap from a first position to a second position.

11. The horizontal stabilizer of claim 10, wherein the actuation mechanism is located near a pivot line of the center member.

* * * * *